United States Patent [19]

Eaton

[11] Patent Number: 5,757,499
[45] Date of Patent: May 26, 1998

[54] METHOD OF LOCATING THE SPATIAL POSITION OF A FRAME OF REFERENCE AND APPARATUS FOR IMPLEMENTING THE METHOD

[76] Inventor: Homer Eaton, 5145 Avenida Encinas, Carlsbad, Calif. 92008

[21] Appl. No.: 750,565

[22] PCT Filed: Jun. 12, 1995

[86] PCT No.: PCT/IB95/00462

§ 371 Date: Dec. 16, 1996

§ 102(e) Date: Dec. 16, 1996

[87] PCT Pub. No.: WO95/35479

PCT Pub. Date: Dec. 28, 1995

[30] Foreign Application Priority Data

Jun. 17, 1994 [FR] France ................... 94 07462

[51] Int. Cl.$^6$ ................................. G01B 11/26
[52] U.S. Cl. ............... 356/375; 356/141.3; 356/141.1; 356/152.1
[58] Field of Search .................. 356/141.3, 141.4, 356/152.1, 375

[56] References Cited

U.S. PATENT DOCUMENTS

| | | | |
|---|---|---|---|
| 4,651,283 | 3/1987 | Sciaky et al. | 364/477 |
| 4,732,471 | 3/1988 | Cain et al. | 356/141.3 |
| 5,187,540 | 2/1993 | Morrison | 356/141.3 |
| 5,198,877 | 3/1993 | Schulz | 356/141.4 |

FOREIGN PATENT DOCUMENTS

| | | |
|---|---|---|
| 0143012 | 5/1985 | European Pat. Off. |
| 0468677 | 1/1992 | European Pat. Off. |
| 2676544 | 11/1992 | France |
| 1181162 | 2/1970 | United Kingdom |
| 8701814 | 3/1987 | WIPO |

*Primary Examiner*—Frank G. Font
*Assistant Examiner*—Zandra V. Smith
*Attorney, Agent, or Firm*—Sixbey, Friedman, Leedom & Ferguson, PC; Gerald J. Ferguson, Jr.; Eric J. Robinson

[57] ABSTRACT

A method of locating the spatial position of a frame of reference comprising placing an emitter module having a fixed stand, a light beam source carried by the stand to pivot about two distance axes and two associated angular position sensors into place. Targets which indicate when they are illuminated by the light beam are placed around the emitter module and the source of the emitter module is caused to pivot so as to illuminate each target in succession so that the corresponding angles of the source are stored, and the angles and the coordinates of the targets are used for computing the position of the frame of reference. The coordinates of the targets are defined during a preliminary calibration step comprising storing in succession the two angles corresponding to the illumination of each of the targets for different positions of the stand, deducing by computation the relative positions between the targets, and measuring and storing the distance between two remarkable points such as two targets or two positions of the stand in order to fix the dimensional scale.

4 Claims, 2 Drawing Sheets

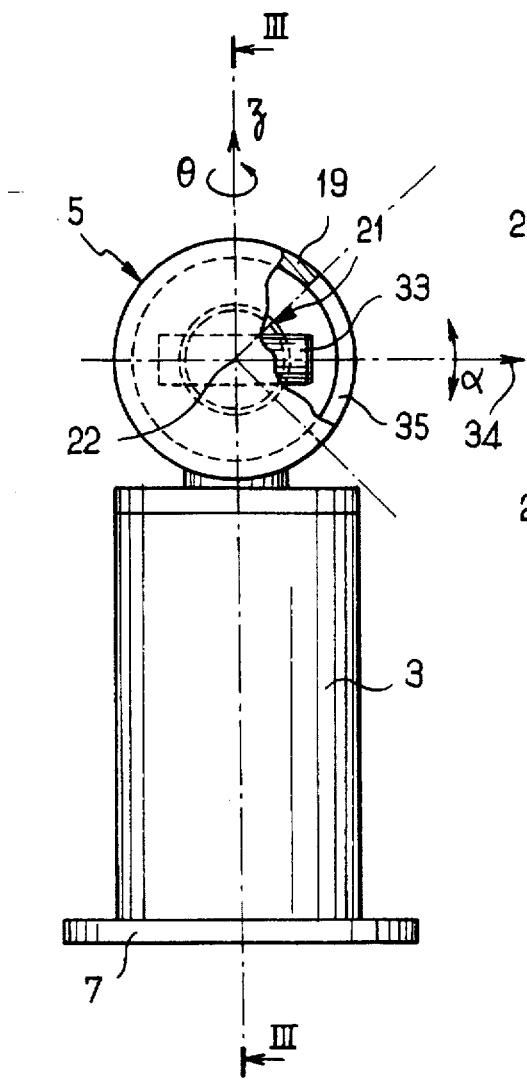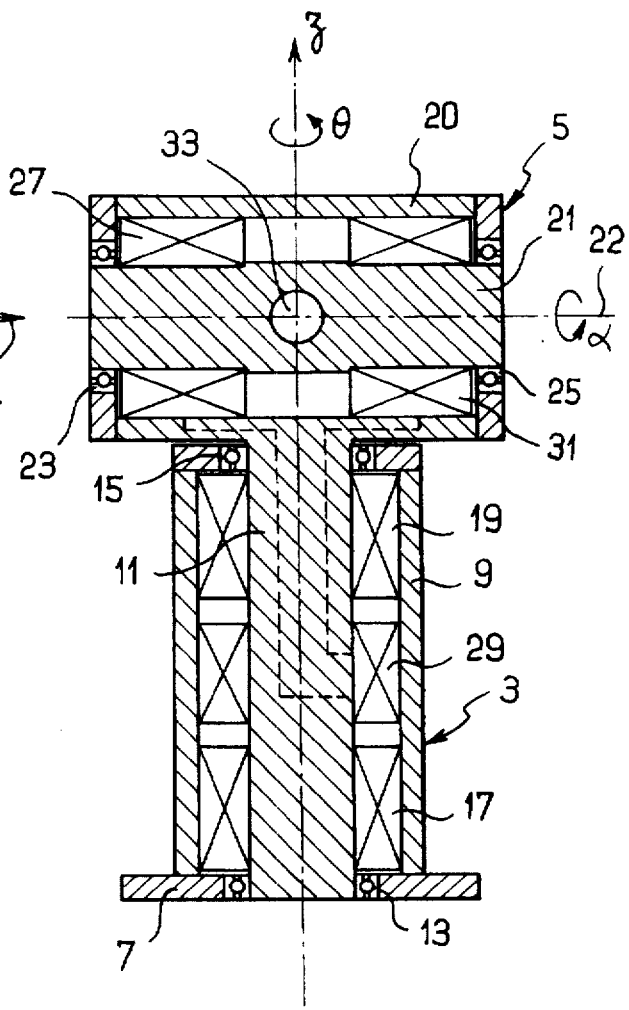
FIG_2    FIG_3

METHOD OF LOCATING THE SPATIAL POSITION OF A FRAME OF REFERENCE AND APPARATUS FOR IMPLEMENTING THE METHOD

The present invention relates in general to a method of locating the spatial position of a frame of reference, i.e. a method making it possible not only to find the position of the origin of the frame of reference relative to a fixed frame of reference, but also to find the orientations of its three axes. The invention also relates to apparatus for implementing the method.

BACKGROUND OF THE INVENTION

In the particular field of techniques for measuring the shape and/or the position of an object by means of a three-dimensional measuring machine, there is an ever-increasing demand for machines that are simultaneously compact, lightweight, and accurate. By way of example, this problem is becoming particularly acute for measuring the positions of objects inside the bodywork of a motor vehicle.

Machines designed twenty or so years ago were bulky and expensive (see for example documents U.S. Pat. No. 3,774, 312, U.S. Pat. No. 3,744,311, U.S. Pat. No. 3,636,635, U.S. Pat. No. 3,279,079). Also, those machines were of limited application since the size of the machine determines the size of the objects that can be measured, and the cost of the machine increases rapidly with size. Because of difficulties in maintaining positioning accuracy and in displacing cantilevered-out elements, machines of that type must also be entirely solid in order to have sufficient rigidity, so that measuring objects of large dimensions (in length or in height) makes it necessary to use machines that are bulky, heavy, and expensive.

Machines that are simpler and handier have been proposed, as illustrated by documents U.S. Pat. No. 3,944, 798 and GB-A-1 498 009, or more recently in document FR-A-2 597 969. Those machines are generally constituted by a support and a deformable arm made up of hinged arm segments, in association with a contact sensor mounted at the end of the last arm segment. The assembly formed in that way is connected to a computer which uses information delivered by the sensor and by position detectors associated with the hinged arm segments. Nevertheless, those machines are more restricted as to accessible length and measurable volume, which turn out generally to be restricted to about one meter from the support of the deformable arm. As a result, if it is desired to perform measurements in a zone that is further away, it is necessary to displace the support. That gives rise to the problem of determining the spatial location of the support since in order to associate a series of measurements performed in a given position of the support with a fixed frame of reference, it is necessary to know the position and the orientation of the support relative to said fixed frame of reference.

Position locating techniques using triangulation are also known.

For example, document EP-A-0 143 012 describes a three-dimensional measuring machine that includes a fixed stand and a measurement head that is movable in a horizontal plane. The measurement head comprises firstly a distance sensor using a vertical laser beam illuminating the point concerned to measure its distance from the measurement head, and secondly means for locating the position of the head in the horizontal plane. Said position-locating means comprise a laser source pivotally mounted about a vertical axis on the measurement head to illuminate in succession three fixed targets disposed in the plane so as to deliver a signal indicating when they are being illuminated by the beam from the laser source. The angular position of the laser source about its vertical axis of rotation is measured by an associated position sensor which, when the targets are illuminated, finds the corresponding angular positions of the source. On the basis of the above information and information relating to the positions of the targets, an electronic processor unit computes the position of the measurement head in the horizontal plane. Nevertheless, that installation is strictly limited to use in two dimensions.

Similarly, documents GB-A-1 181 162 and U.S. Pat. No. 5,258,822 describe devices for providing assistance in navigation to enable the position of a moving body such as an aircraft, a ship, or a land vehicle to be found in a horizontal plane. As before, those devices comprise a laser source that is rotatable about a vertical axis to illuminate in succession three targets disposed in known fixed positions in order to use triangulation to compute the coordinates of the moving body in the horizontal plane on the basis of the corresponding three angular positions of the laser source. However, in that case also, that type of device is unsuitable for finding the altitude of the moving body or its orientation in three dimensions.

Document EP-A-0 468 677 describes a method and apparatus for locating the spatial position of an object and capable of determining both the position of the object and its orientation. That apparatus includes an emitter module comprising a light source that is rotatable about two distinct non-parallel axes (azimuth and zenith) which are associated with angular position sensors. Three targets are disposed around the emitter module at known locations and the angular positions of the light source (about the azimuth and zenith axes) are found at which each of the targets is illuminated. On the basis of that information and on the basis of information relating to the known locations of the targets, an electronic processor unit computes the position and the orientation of the emitter module. With such a method, it is thus possible to locate the spatial position and the orientation of a support for a three-dimensional measuring machine.

Nevertheless, in all of the above-mentioned apparatuses, location accuracy depends on the accuracy with which the coordinates of the targets are measured and on the accuracy with which the various parameters of the locating system are known, in particular parameters relating to the adjustment of the angular position sensors for the light source.

OBJECTS AND SUMMARY OF THE INVENTION

An object of the invention is specifically to solve that problem by proposing a technique for locating the spatial position of a frame of reference that makes extremely accurate and reliable location possible.

More particularly, the invention relates to a method of locating the spatial position of a frame of reference, the method comprising the following steps:

the following are put into place, an emitter module comprising a stand that is fixed relative to the frame of reference that is to be located, a light beam source mounted on the stand to pivot about two distinct non-parallel axes, and two angular position sensors associated with the corresponding rotary movements of the source relative to the stand;

a plurality of targets are disposed around the emitter module in locations that are defined relative to a fixed frame of reference, which targets are suitable for delivering an electrical signal indicating that they are being illuminated by the light beam emitted by the source;

the source of the emitter module is caused to pivot about at least one of the two axes of rotation, the stand of the module remaining stationary, so as to direct the emitted light beam to each of the targets in succession so that the signal delivered by each illuminated target causes the corresponding angles measured by the two angular position sensors for each illuminated target to be stored; and said angles and the coordinates of the defined locations of the targets are used to compute the position of the frame of reference in the fixed frame of reference.

According to the essential characteristic of the invention, the locations of the targets are defined in the fixed frame of reference during a preliminary calibration step during which:

the two angles corresponding to successive illumination of each of the targets are stored for a plurality of different positions of the stand of the emitter module;

the relative positions between the various targets are deduced therefrom by computation; and the distance between two remarkable points, such as two targets or two positions of the base is measured and stored in order to fix the dimensional scale.

The locating method of the present invention thus makes it possible to determine with very great accuracy the spatial position of a frame of reference, i.e. in three dimensions, without the object to which it is attached being connected to any mechanical element. This lack of mechanical linkage provides very great freedom of movement to the object whose position is located. When the object is a moving support for a three-dimensional measurement machine, this facility provides a particularly well adapted solution to the problem mentioned above of limitations on measurable volumes.

In a particular variant of the method of the invention, the targets are disposed in a common plane, in particular a horizontal plane. The preliminary calibration step then uses at least four targets and six different positions of the stand of the emitter module.

According to another particular characteristic of the method of the invention, in which each target includes a photoelectric detection screen of area that is significantly greater than the section of the light beam to provide a signal giving the position of the impact of the light beam on said screen relative to a fixed origin of said screen, the signal from the screen of each successively illuminated target is combined with the signals from the two angular position sensors of the source of the emitter module to deduce therefrom the position of the frame of reference to be located.

The invention also provides apparatus specifically designed to implement the above method, and comprising:

an emitter module comprising a stand that is fixed relative to the frame of reference to be located, a light beam source mounted on the stand and capable of pivoting about two distinct non-parallel axes, and two angular position sensors associated with the corresponding rotary movements of the source relative to the stand;

a plurality of targets suitable for delivering respective electrical signals indicating that they are being illuminated by the light beam emitted by the source, the targets being disposed around the emitter module in locations that are defined relative to a fixed frame of reference, each of the targets including a photoelectric detection screen of area that is substantially greater than the section of the light beam so as to provide the electronic processor unit with a signal giving the position of the impact of the light beam on said screen relative to a fixed origin of said screen; and an electronic processor unit receiving the signals from each of the targets and the signals from the angular position sensors associated with the source of the emitter module, said electronic processor unit including a computation module for determining the position of the frame of reference to be located in the fixed frame of reference on the basis of said signals.

BRIEF DESCRIPTION OF THE DRAWINGS

Other characteristics and advantages of the invention appear more clearly in the light of the following description and the accompanying drawings relating to a particular embodiment, and in which:

FIG. 2 is an elevation view of the apparatus of the invention (partially cutaway to show more clearly the light beam source and the associated through opening); and FIG. 3 is a section on line III—III of FIG. 2 showing diagrammatically the two drive motors and the two angular position sensors fitted to the emitter module.

MORE DETAILED DESCRIPTION

Figure 1:
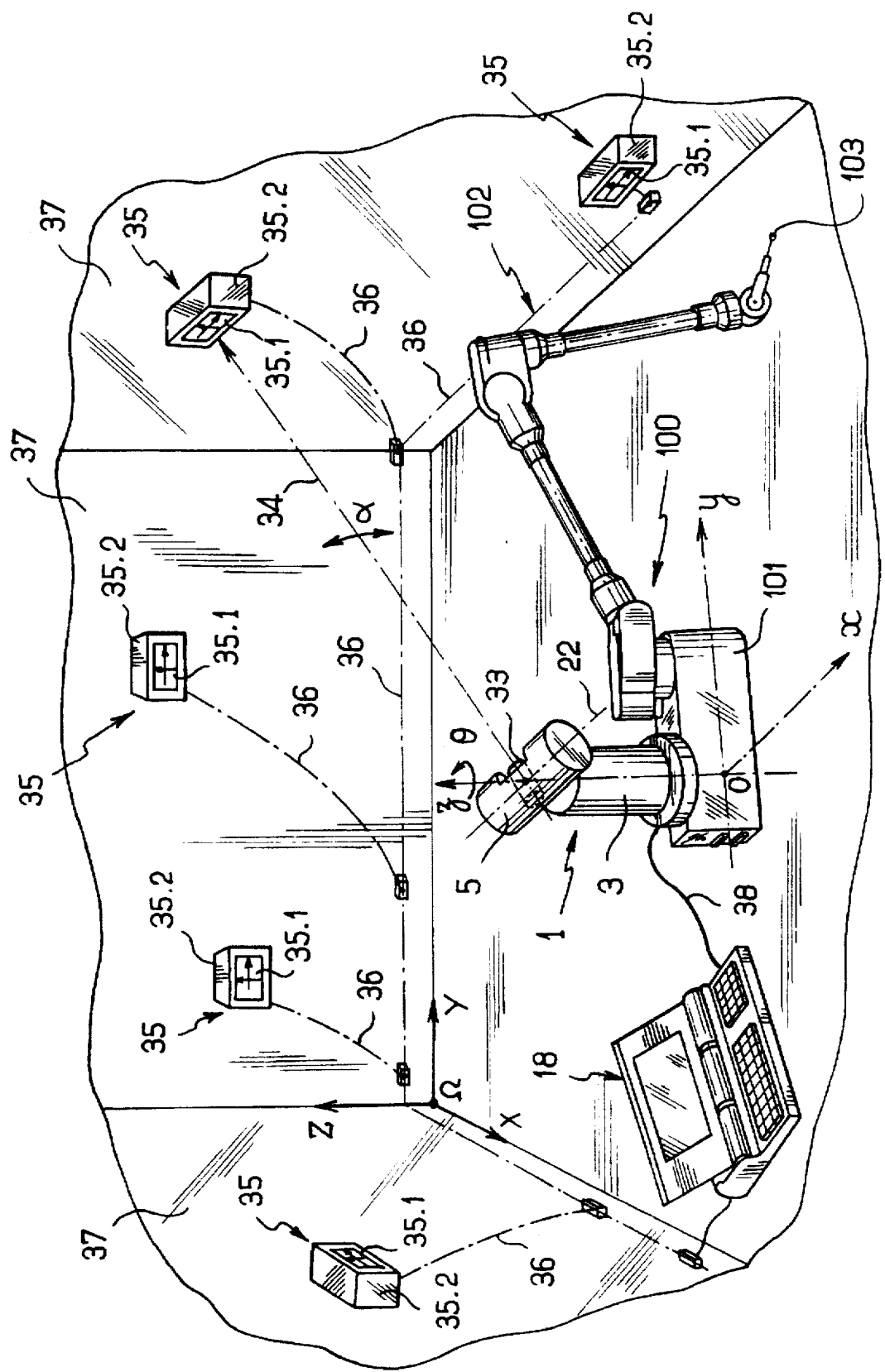
FIG. 1 is a perspective view showing diagrammatically an implementation of the method and the apparatus of the invention, in this case for locating the position of the moving support of a three-dimensional measurement machine having articulated arms.

FIG. 1 is a diagram showing apparatus for locating the position of a frame of reference (O,x,y,z) associated with a three-dimensional measurement machine 100 of the type that is easily displaced and disposed inside an enclosure having walls referenced 37, and associated with a fixed frame of reference written ($\Omega$,X,Y,Z). In this case, the machine is constituted by a support 101 associated with the frame of reference to be located (O,x,y,z), and by a deformable arm 102 constituted by a plurality of arm segments, having a contact sensor 103 mounted at the end of the last articulated arm segment. The locating apparatus comprises an emitter module 1 which is constituted by a stand 3 secured to the support 101 and thus fixed relative to the frame of reference (O,x,y,z), and a moving head 5 mounted on the stand 3 to pivot about the z-axis of the above-specified frame of reference.

In the example shown, the machine 100 stands on the ground of the enclosure which is horizontal, such that the z-axis is substantially vertical, i.e. parallel to the Z-axis which is likewise vertical in this case. Naturally, the invention is not limited to this disposition and the z-axis as well as the x- and y-axes of the frame of reference to be located may all be oriented in arbitrary directions.

Thus, in the most usual case, locating the position of the frame of reference (O,x,y,z) is a question of determining six variables, three of which specify the position of the origin O and the other three of which specify the director cosines of the x-, y- and z-axes.

As can be seen more clearly in FIGS. 2 and 3, the stand 3 of the emitter module comprises a fixing base 7 and a cylindrical body 9 secured to the base 7 and having the z-axis as its own axis. The cylindrical body 9 has a shaft 11 passing therethrough which is mounted to rotate relative to the stand 3 in a ball bearing 13 mounted in the base 7 and a ball bearing 15 mounted at the end of the cylindrical body 9 that is remote from the base 7. Rotation of the shaft 11 about the z-axis is controlled by an electric motor 17 which is powered by a driver unit (not shown). The angular position of the shaft 11 relative to the z-axis is determined by an angle θ which is measured by an angular position sensor 19 mounted between the shaft 11 and the cylindrical body 9 and which is connected to an electronic processing unit 18.

The end of the shaft 11 remote from the base 7 is connected to the moving head 5. The head comprises a cylindrical body 20 whose axis 22 is perpendicular to the z-axis, and the middle of the body is fixed to the shaft 11. The cylindrical body 20 has a coaxial shaft 22 passing therethrough and mounted to rotate about the axis 22 between two ball bearings 23 and 25 disposed at respective ends of said cylindrical body. Rotation of the shaft 21 about the axis 22 is under the control of an electric motor 27 which is connected via a rotary coupling 29 disposed between the shaft 11 and the cylindrical body 9 to the driver unit. The position of the shaft 21 about the axis 22 is defined by an angle α which is measured by an angular position sensor 31 housed in the cylindrical body 20 and connected via a rotary coupling 29 to the electronic processor unit 18. The electrical connections between the rotary coupling 29 and the motor 27, and those between the rotary coupling an the sensor 3 are represented herein by dashed lines (the outer wires of the electrical connections, corresponding to the cable 38 which can be seen in FIG. 1, and serving to connect the motor 17, the sensor 19, and the rotary coupling 29 to the electronic unit 18 are not shown in the diagrammatic view of FIG. 3).

The middle of the shaft 21 is fitted with a light beam source 33, such as a laser source, which extends transversely relative to the axis 22 of the shaft 21. It will be observed that this source is thus rotatable both relative to the axis 22 and relative to the z-axis. An opening 35 is formed through the cylindrical body 20 to pass the light beam 34 from the source 33. The extreme positions of the beam 34 in its rotation about the axis 22 (angle α) are represented in FIG. 2 by chain-dotted lines. The angular range may be 45° on either side of a middle position perpendicular to the z-axis, for example.

Rotation about the z-axis (angle θ) is not necessarily limited to any particular angular range. Free rotation about the z-axis gives greater flexibility in use of the module if the z-axis is vertical.

The apparatus also comprises active targets 35 fixed to the walls 37 associated with the fixed frame of reference (Ω,X, Y,Z). The term "active target" is used herein to cover any type of receiver capable of emitting a signal indicating that it is being illuminated by the light beam in use.

The above-described apparatus makes it possible to implement the positioning locating method of the invention. In the most general definition of this method, provision is made for the following succession of steps:

the emitter module 1 and the active targets 35 are put into place;

the source 33 of the emitter module 1 is caused to pivot about at least one its two axes of rotation, i.e. z and 22, while the stand 3 of the module remains stationary, thereby directing the emitted light beam successively to each of the active targets 35 such that the signal delivered by each illuminated target causes two corresponding angles θ and α as measured by the two angular position sensors 19 and 31 for the illuminated target to be recorded; and the electronic processing unit (18) uses the angles θ and α as the coordinates of the final locations of the active targets 35 to compute the position of the frame of reference (O,x,y,z), i.e. the position of its origin and the orientation of each of its three axes, in terms of the fixed frame of reference (Ω,X,Y,Z).

In the particular embodiment of the apparatus shown in the figures, there are five active targets 35, it being understood that in any event it is necessary to have at least three targets.

Each active target 35 preferably comprises a rectangular screen 35.1, and it delivers to each of the corners of its screen an electrical current that is inversely proportional to the distance between the impact of the light beam from the source 33 on said screen and the corresponding corner of the screen. Such screens are generally used in the field of adjusting and inspecting mechanisms for controlling the orientation of light beams such as laser beams. By way of example, the screens of the active targets may be constituted by pin-spot 2D type sensors manufactured by the American firm UDT Sensors. The target 35 also has an electronics unit 35.2 disposed behind the screen 35.1 and transforming the signals from the four corners of the screen into an electrical signal giving the coordinates of the impact of the laser beam from the source 33 in the plane of the screen 35.1 relative to a fixed origin (usually situated in the center of the screen).

This signal is transmitted by means such as electrical cables 36 represented by chain-dotted lines in FIG. 1 to the electronic processor unit 18. The electronic processor unit 18 thus receives the signals coming from each of the active targets 35 together with the angle values taken by the angular position sensors 19 and 31.

The targets 35 are disposed around the emitter module 1 and are well spaced apart from one another at locations whose coordinates in the frame of reference (Ω,X,Y,Z) are known and stored in the electronic processor unit 18.

According to an essential characteristic of the invention, its coordinates are determined automatically during a preliminary calibration step. In this preliminary step:

for a plurality of different positions of the stand 3 of the emitter module 1, the two angles θ and α read by the angular position sensors 19 and 31 of the source 33 and corresponding to successive illumination of each of the active targets 35 are stored;

the positions of the targets relative to one another are deduced therefrom by computation; and the distance between two remarkable points is measured and stored in order to set a dimensional scale.

The two above-mentioned remarkable points may be constituted, for example, by the locations of two of the active targets 35 or by two positions of the stand 3, with measurement then being performed manually and communicated to the electronic processor unit 18. These remarkable points may also be two arbitrary points, such as the two ends of a rule of known length, for example, in which case it is possible to adjust the computer of the three-dimensional measurement machine by touching each of the ends of the rule with the contact sensor 103 and then establishing a connection between the computer and the electronic processor unit 18.

During this preliminary calibration step, it is preferable to use at least five active targets 35 and twelve different positions of the stand 3 of the emitter module 1.

To implement the method by means of the above described apparatus, the above-mentioned driver unit is used to drive the motors 17 and 27 so that the light beam 34 from the source 33 illuminates the screen 35.1 of each of the active targets 35 in succession. On each aim, the target 35 receiving the light beam transmits the coordinates of the impact of the light beam 34 on the plane of the associated screen 35.1 to the electronic processor unit 18. The electronic processor unit 18 then stores the angles θ and α corresponding to the angular positions of the shafts 11 and 21 as sensed by the angular position sensors 19 and 31. The electronic processor unit 18 then combines that data for each target 35 to deduce therefrom the two ideal angular positions that would have been sensed by the position sensors 19 and 31 of the emitter module 1 had the light beam impact between situated exactly at the fixed origin in the plane of the screen 35.1. The two ideal angles as determined in this way for each active target are then transmitted to a computer module (not shown) of the electronic processor unit 18. Once all of the active targets 35 have been illuminated and all of the corresponding ideal angles have been transmitted to the computer module, it uses said angles and the coordinates of the locations of the active targets 35 in the fixed frame of reference (Ω,X,Y,Z) to compute the position of the frame of reference (O,x,y,z) in the frame of reference (Ω,X,Y,Z).

In a particular variant of the position locating method, it is possible to place all of the active targets 35 in a common plane which optionally contains the origin O of the frame of reference to be located (O,x,y,z). Identification can then be considered as no longer being three-dimensional, but as being two-dimensional, particularly when the common plane is horizontal, since the stand of the module is merely placed on a horizontal plane.

In this case, at least four targets 35 are used together with six different positions of the stand 3 of the emitter module 1.

In the special case of the z-axis of the module being substantially orthogonal to the common plane of the targets and of positioning such that the angle α is zero, then only the angle θ varies during illumination of successive targets. If the z-axis is not exactly orthogonal to the plane of the targets, then the exact orientation of the z-axis is determined solely from the position of the impact of the light beam on the photoelectric detection screen of each target.

The invention is not limited to the embodiment described above, but on the contrary covers any variant using equivalent means to reproduce the essential characteristics specified above.

For example, although each active target 35 in the example shown comprises a large screen making it easier to aim the light beam onto the screen, it would also be possible to use active targets having narrower light beam receiving screens and transmitting a simple on/off type signal to the electronic processor unit corresponding to each individual target being illuminated or not illuminated by the light beam 34. Such active targets would then be analogous to conventional photocells. Under such circumstances, the angles θ and α giving the angular positions of the shafts 11 and 21 of the emitter module 1 are transmitted directly to the computation module, since the signals from the active targets 35 then serve only to trigger storing of said angular positions.

Also, even if apparatus is described above in which the signals from the active targets 35 are transmitted to the electronic processor unit 18 via electrical cables, it is equally possible for said connection to be achieved by a wireless transmitter/receiver system. Otherwise, it is also possible to use passive reflecting targets associated with a photocell disposed on the emitter module to receive the light beam reflected by each target.

Finally, although the emitter module 1 in the example shown is mounted on a moving support of a three-dimensional measurement machine, the emitter module could naturally be applied to any other object whose spatial position and orientation are to be determined.

A technique has thus been provided making it possible to locate the spatial position of a frame of reference on the basis of angle measurements, which technique is more accurate and more reliable than the above-mentioned prior art techniques, because of the autocalibration of the apparatus used.

I claim:

1. A method of locating the spatial position of a frame of reference (O,x,y,z), the method comprising the following steps:

the following are put into place, an emitter module (1) comprising a stand (3) that is fixed relative to the frame of reference (O,x,y,z) that is to be located, a light beam source (33) mounted on the stand (3) to pivot about two distinct non-parallel axes (z, 22), and two angular position sensors (19, 31) associated with the corresponding rotary movements of the source (33) relative to the stand (3);

a plurality of targets (35) are disposed around the emitter module (1) in locations that are defined relative to a fixed frame of reference (Ω,X,Y,Z), which targets are suitable for delivering an electrical signal indicating that they are being illuminated by the light beam emitted by the source (33);

the source (33) of the emitter module (1) is caused to pivot about at least one of the two axes of rotation (z, 22), the stand (3) of the module remaining stationary, so as to direct the emitted light beam to each of the targets (35) in succession so that the signal delivered by each illuminated target causes the corresponding angles (θ, α) measured by the two angular position sensors (19, 21) for each illuminated target to be stored; and said angles and the coordinates of the defined locations of the targets (35) are used to compute the position of the frame of reference (O,x,y,z) in the fixed frame of reference (Ω,X,Y,Z);

the method being characterized in that the locations of the targets (35) defined in the fixed frame of reference (Ω,X,Y,Z) during a preliminary calibration step during which:

the two angles (θ, α) corresponding to successive illumination of each of the targets (35) are stored for a plurality of different positions of the stand (3) of the emitter module (1);

the relative positions between the various targets are deduced therefrom by computation; and the distance between two remarkable points, such as two targets or two positions of the base is measured and stored in order to fix the dimensional scale;

wherein for the preliminary calibration step, at least five targets and twelve different positions of the stand of the emitter module are used.

2. A method according to claim 1, in which each target includes a photoelectric detection screen of area that is significantly greater than the section of the light beam to provide a signal giving the position of the impact of the light beam on said screen relative to a fixed origin of said screen, wherein the signal from the screen of each successively illuminated target is combined with the signals from the two angular position sensors of the source of the emitter module to deduce therefrom the position of the frame of reference to be located.

3. Apparatus for implementing the method according to any claim 1, the apparatus comprising:

an emitter module (1) comprising a stand (3) that is fixed relative to the frame of reference to be located (O,x,y, z), a light beam source (33) mounted on the stand (3) and capable of pivoting about two distinct non-parallel axes (z, 22), and two angular position sensors (19, 31) associated with the corresponding rotary movements of the source (33) relative to the stand (3);

a plurality of targets (35) suitable for delivering respective electrical signals indicating that they are being illuminated by the light beam emitted by the source (33), the targets being disposed around the emitter module (1) in locations that are defined relative to a fixed frame of reference ($\Omega$,X,Y,Z); and an electronic processor unit (18) receiving the signals from each of the targets (35) and the signals from the angular position sensors associated with the source (33) of the emitter module (1), said electronic processor unit including a computation module for determining the position of the frame of reference to be located (O,x, y,z) on the basis of said signals;

the apparatus being characterized in that each of the targets (35) includes a photoelectric detection screen (35.1) of area that is substantially greater than the section of the light beam so as to provide the electronic processor unit (18) with a signal giving the position of the impact of the light beam on said screen (35.1) relative to a fixed origin of said screen.

4. A method of locating the spatial position of a frame of reference (O,x,y,z), the method comprising the following steps:

the following are put into place, an emitter module (1) comprising a stand (3) that is fixed relative to the frame of reference (O,x,y,z) that is to be located, a light beam source (33) mounted on the stand (3) to pivot about two distinct non-parallel axes (z, 22), and two angular position sensors (19, 31) associated with the corresponding rotary movements of the source (33) relative to the stand (3);

a plurality of targets (35) are disposed around the emitter module (1) in locations that are defined relative to a fixed frame of reference ($\Omega$,X,Y,Z), which targets are suitable for delivering an electrical signal indicating that they are being illuminated by the light beam emitted by the source (33);

the source (33) of the emitter module (1) is caused to pivot about at least one of the two axes of rotation (z, 22), the stand (3) of the module remaining stationary, so as to direct the emitted light beam to each of the targets (35) in succession so that the signal delivered by each illuminated target causes the corresponding angles ($\theta$, $\alpha$) measured by the two angular position sensors (19, 21) for each illuminated target to be stored; and said angles and the coordinates of the defined locations of the targets (35) are used to compute the position of the frame of reference (O,x,y,z) in the fixed frame of reference ($\Omega$,X,Y,Z):

the method being characterized in that the locations of the targets (35) defined in the fixed frame of reference ($\Omega$,X,Y,Z) during a preliminary calibration step during which:

the two angles ($\theta$, $\alpha$) corresponding to successive illumination of each of the targets (35) are stored for a plurality of different positions of the stand (3) of the emitter module (1);

the relative positions between the various targets are deduced therefrom by computation; and the distance between two remarkable points, such as two targets or two positions of the base is measured and stored in order to fix the dimensional scale;

wherein for the preliminary calibration step, at least five targets (35) and six different positions (3) of the emitter module (1) are used; and wherein the targets (35) are disposed in a common plane, in particular a horizontal plane.

* * * * *